Figure 1:
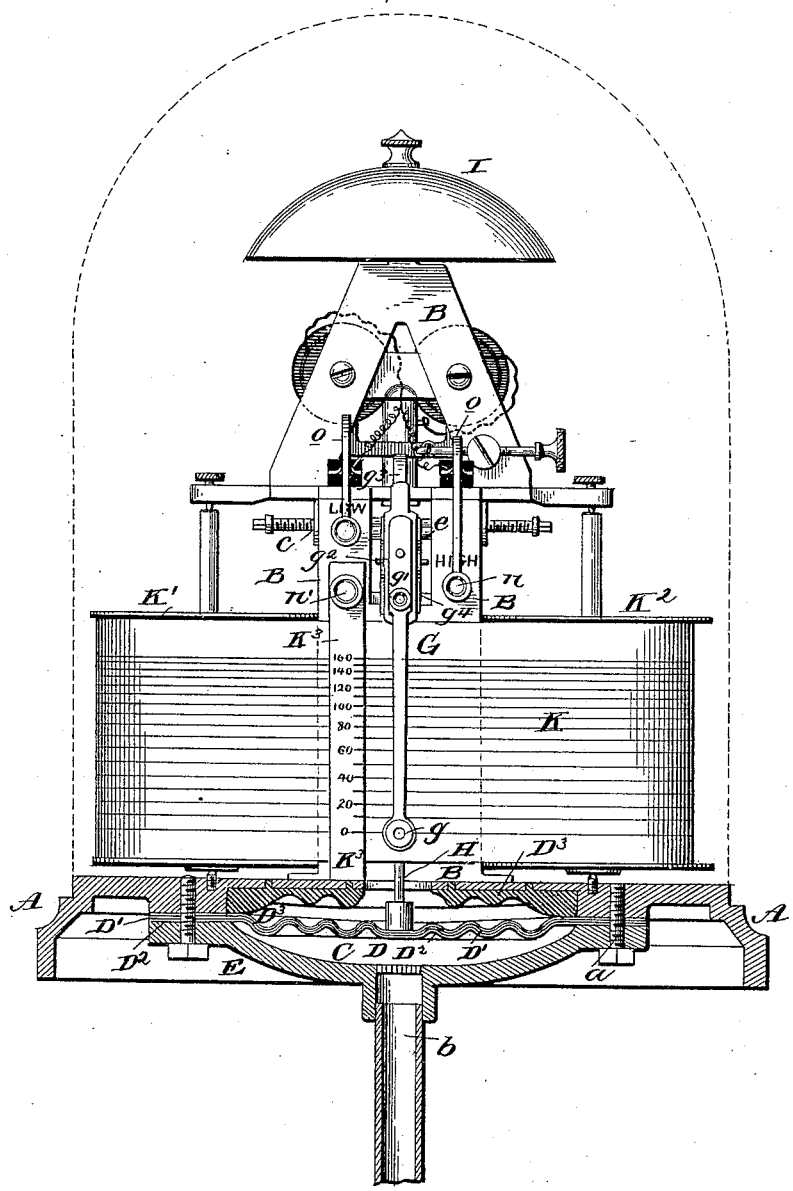

(No Model.) 4 Sheets—Sheet 1.

J. B. EDSON.
RECORDING PRESSURE GAGE.

No. 443,360. Patented Dec. 23, 1890.

Witnesses
L. C. Hills.
Ewell A. Dick

Inventor
Jarvis B. Edson
by Marcellus Bailey
his Attorney (No Model.) 4 Sheets—Sheet 2.
J. B. EDSON.
RECORDING PRESSURE GAGE.
No. 443,360. Patented Dec. 23, 1890.
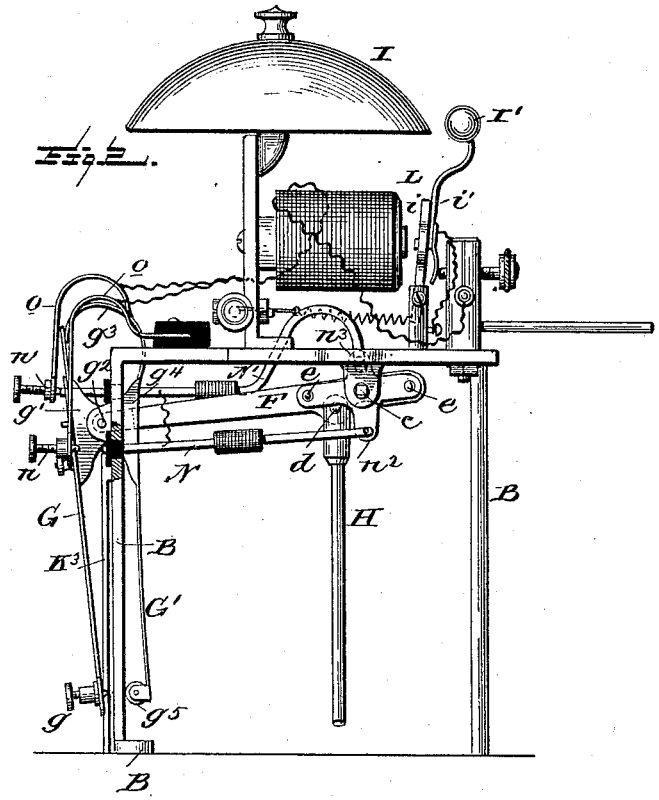
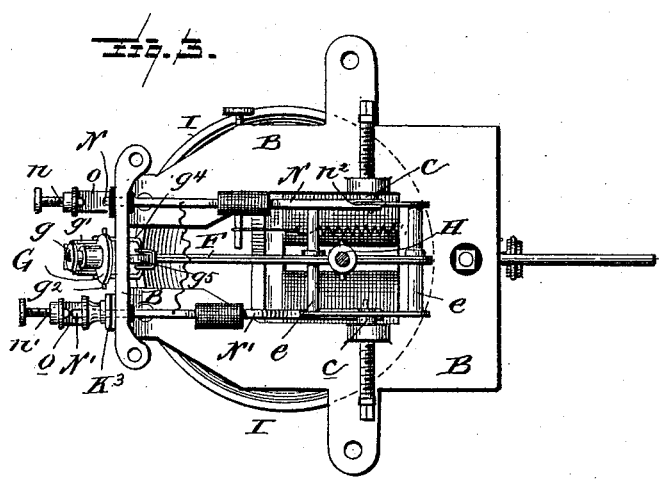

(No Model.) 4 Sheets—Sheet 3.
J. B. EDSON.
RECORDING PRESSURE GAGE.
No. 443,360. Patented Dec. 23, 1890.
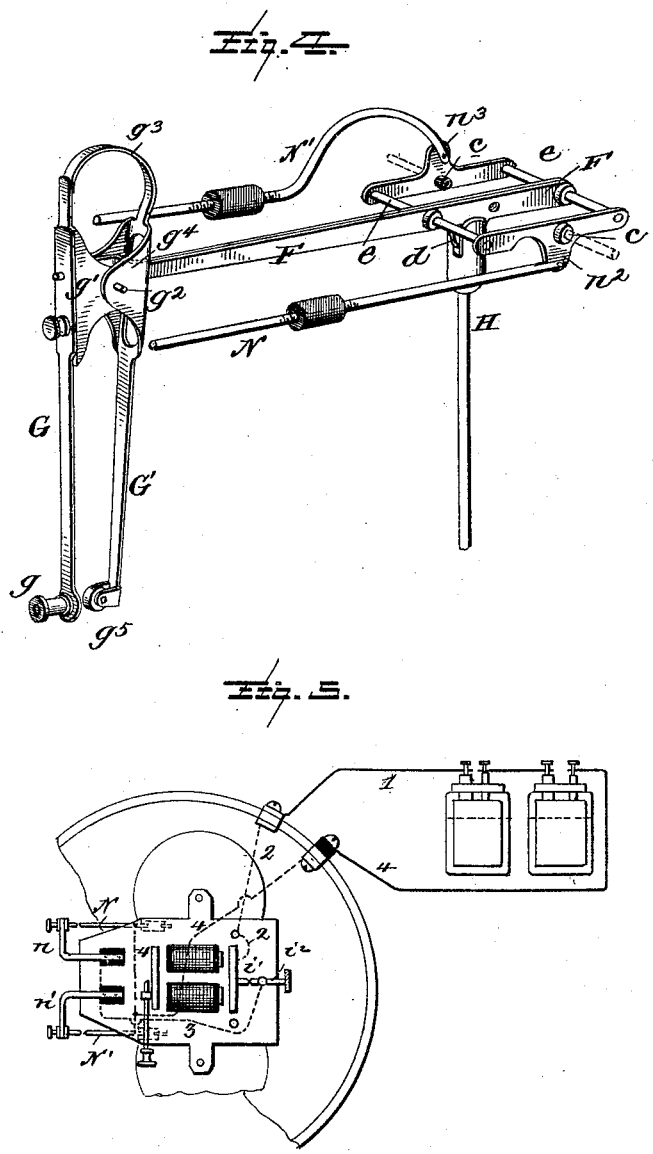

(No Model.) 4 Sheets—Sheet 4.
J. B. EDSON.
RECORDING PRESSURE GAGE.
No. 443,360. Patented Dec. 23, 1890.
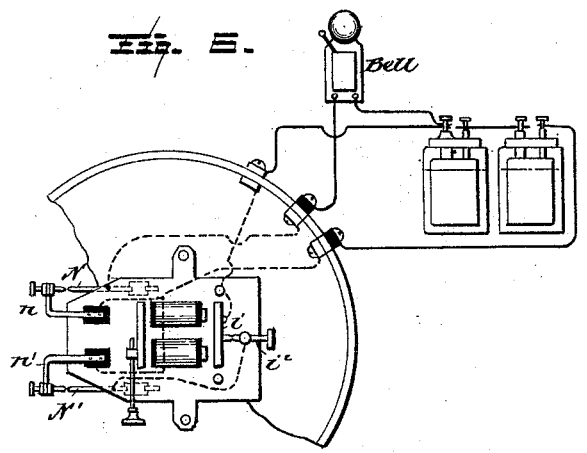
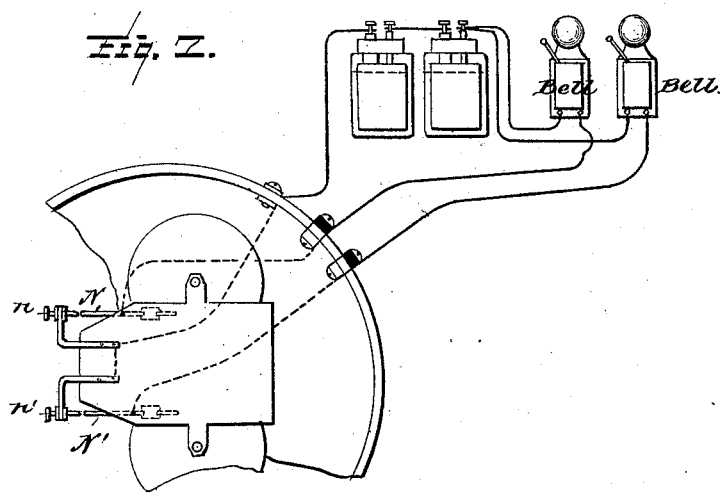

UNITED STATES PATENT OFFICE.

JARVIS B. EDSON, OF NEW YORK, N. Y.

RECORDING PRESSURE-GAGE.

SPECIFICATION forming part of Letters Patent No. 443,360, dated December 23, 1890.

Application filed June 12, 1890. Serial No. 355,180. (No model.)

*To all whom it may concern:*

Be it known that I, JARVIS BONESTEEL EDSON, of the city, county, and State of New York, have invented certain new and useful Improvements in Recording Pressure-Gages, of which the following is a specification.

The object I have in view in these improvements is mainly to enhance the adaptability of the gage to recording and to render possible a reduced cost of construction. Modern engineering employs greater pressures than were common a few years since, and in providing a recorder suitable thereto it has been found necessary to employ a number of thin springs or disks to resist the great strain to which any form of diaphragm is subjected. In order to secure greater sensitiveness and durability, it is important to obtain the utmost travel or displacement per unit of diameter of disk, and for the purposes for which the instrument is designed it is equally necessary to employ this travel with as little multiplication as possible of levers, gears, &c., owing to the difficulties arising from loss of motion inherent in the construction, or subsequently occasioned by wear, as well as to employ such method of construction as shall enable a spring or disk to transmit its full travel with a minimum of friction. Furthermore, when high pressures of dangerous fluids or gases are to be recorded, it is highly important to provide against the serious results which would follow in case of rupture of any of the diaphragms due to over-pressure or fatigue of metal. It is furthermore desirable to be able to control these pressures within certain limits by the sounding of electrical alarms, either on the instrument or at a distance, when certain limits of pressure are exceeded or when pressure falls below prescribed limits. It is further important that these alarms be susceptible of ready adjustment to these different pressures, and also that when so adjusted or set to any given limits of pressure they may be easily tested from time to time in order to ascertain whether the battery, wires, or bells are in proper condition without changing or disturbing the adjustment of these circuit-closers. To provide for the accomplishment of these results, I place either one or more tempered-steel diaphragm-springs beneath the circular base, the said springs being convexly corrugated and so placed as to receive the fluid-pressure against the convex surface of the diaphragm. By corrugating these diaphragm-springs convexly and causing the pressure to act against the convexed side I am enabled to restrict the travel of the spring during its early movement, resulting in giving more travel and sensitiveness as the diaphragm distends until a point is reached at which it begins to rapidly slow down with the motion of each additional equal increment of pressure. This is an important matter in a recording-gage of limited travel and limited width of chart, particularly when designed for high pressures.

In order to secure greater sensitiveness and durability where extreme high pressures are to be resisted, I employ a number of these diaphragms, convexly corrugated, as described, and in order to provide against the action on the spring exposed to the fluid, which is often caused by galvanic action, &c., I place beneath the lower spring a thin flexible lining or sheathing—say of copper or an alloy of copper—so that the fluid under pressure cannot reach the steel diaphragms. In order to provide against the danger which might be caused by the bursting of one or more of these diaphragms, if in so doing it allowed the fluid or gas to escape, I place either below or between the tempered-steel diaphragms a soft-metal one, corrugated the same as the remainder, but left untempered, so as to be tough and yielding, but having less rigidity than those which are tempered. To further provide against accidents which might be caused by the escape of the imprisoned fluid or liquid under pressure, I fill in the space above the spring or springs in such manner that when the springs have been distended to the full extent to which they are intended for the instrument the action of any further pressure tending to further deflect them will be resisted by the metal of the base. This is accomplished in various ways; but the one which I prefer is to fill in with soft metal having a low fusing-point, or cement or other suitable substance, while the pressure holds the spring deflected to its full range. Another method which works well in practice is to make a plaster cast while the springs are under pressure and then remove it. Then make a metal cast from the same.

In order to simplify as far as possible the movement-transmitting mechanism of the gage, I make use of a multiplying-lever, which is in effect through a suitable connection joined directly to the diaphragm-spring or upper diaphragm-spring if more than one be used, and to this multiplying-lever I attach a marking-arm, which is flexible or has a flexible connection with the lever, so that during the vibrations of the lever the said arm may move up and down while maintaining contact with the paper on which its movements are recorded. The details of this mechanism, together with those of the mechanism for the electrical alarm, as well as those of the other improvements hereinbefore referred to, can, however, best be explained and understood by reference to the accompanying drawings, in which I have represented a pressure-gage embodying my said improvements in their preferred form.

In the drawings, Figure 1 is a front elevation of the instrument with the base in section. Fig. 2 is a side elevation of the mechanism above the base. Fig. 3 is a bottom view or plan of the same. Fig. 4 is a perspective view, on enlarged scale, of the multiplying-lever and parts immediately connected therewith. Figs. 5, 6, and 7 are diagrammatic views hereinafter more particularly referred to.

In this gage I may employ one or more tempered diaphragm-springs, said springs being convexly corrugated and so placed as to receive the fluid-pressure against the convex surface of the diaphragm. In the drawings I have shown two of such diaphragm-springs, similar in a general way to the like part in my Letters Patent, No. 174,125, of February 29, 1876.

A is the base of the instrument, chambered or recessed at C, and D are two sheet-steel corrugated diaphragm-springs bunched together in the chamber or recess and secured at their edges to the base in the customary way by the shell E, which clamps said edges and is fastened in place by bolts $a$, passing through the flange of the shell and the intervening edge of the diaphragm-springs into the base. The diaphragm-springs are convexly corrugated, as shown, and are so placed that the pressure of the fluid entering through the port or duct $b$ in the shell will be exerted against the convex side of the said bunched diaphragm-springs. Below these two tempered diaphragm-springs and bunched with them is a similarly-corrugated soft-metal untempered one D′, for the purpose hereinbefore mentioned, and below diaphragm D′ is a thin flexible sheathing $D^2$, of copper, brass, or the like, to prevent danger of the injurious corroding action which might take place were the diaphragms exposed to direct contact with the fluid.

Above the upper diaphragm is a metal filling or backing $D^3$, which is intended to resist further deflection of the springs after they have been distended to the full extent to which they are intended for the instrument. This backing, in the particular shape represented in the drawings, is a soft-metal backing, which is formed by first distending the springs to the full extent and then, while maintaining them in this position, running into the base above the springs a soft metal having a low fusing-point. This backing, when it cools and solidifies, is in effect a counterpart casting of the upper surface of the diaphragm-spring. The backing, however, can be formed in other ways—as, for example, by casting the iron base A a little full on the under side and then turning this full under side down into suitable shape to form the backing, or by proceeding to form it in any of the ways hereinbefore adverted to. What is essential is that there shall be for the diaphragm-springs a backing which after the said diaphragm-springs have been distended to a predetermined extent will resist their further deflection.

Upon the base A and a suitable frame B erected thereon are supported the various parts of the recording and electrical-alarm mechanisms.

The instrument is provided, as usual, with the customary spools or reels K′ $K^2$, from one to the other of which the strip of paper K passes over an intervening portion of the frame, on which there is a fixed vertical scale $K^3$ to indicate the different pressures. The strip of paper passes behind the scale between it and the frame, and said strip, as usual, is ruled with parallel lines to correspond with the divisions on the scale. The paper as it unwinds from one spool is wound upon the other, the spools for this purpose being driven by a chronometer mechanism, as usual. This actuating mechanism I have not deemed it necessary to illustrate, as it forms no part of my present invention. One such mechanism for the purpose is set forth in my Letters Patent, No. 174,125, hereinbefore referred to.

I come now to the indicating mechanism, which consists of the multiplying-lever F, the flexible marking-arm G, and the connecting-rod H, which connects the multiplying-lever to the diaphragm-spring. The multiplying-lever I prefer to form at its rear end with a rectangular skeleton frame, which is hung by its sides upon pivots $c$. The connecting-rod H is solidly fastened to the diaphragm-spring below, and above it is jointed or pinned at $d$ to the multiplying-lever. The front and rear cross-bars $e$ of the skeleton frame, in which the rear portion of the multiplying-lever is secured, are of metal, and by bending them slightly to the front or rear, as the case may be, the point of attachment of the connecting-rod to the multiplying-lever can be moved nearer to or farther from the axis of motion of the lever, thus adjusting with the greatest nicety the throw of the lever for a given vertical movement of the connecting-rod. The multiplying-lever at its front extends through a passage or opening made for it in the front of the frame B, and to its outer end is secured the flexible vertical marking-arm G. This arm may be formed and secured to the lever in a variety of ways. The construction I now prefer on the whole is represented in the drawings. As there shown, the marking-arm, which is composed of a flexible spring metallic strip provided at its lower end with a socket or holder $g$ for the pencil or other marking device, is secured at its upper end by a set-screw or otherwise to a head $g'$, which is pinned or pivoted at $g^2$ to the multiplying-lever. A spring $g^3$ bears outwardly against the upper portion of the head at a point above the pivot $g^2$ with the effect of keeping the lower end of the flexible marking-arm in contact with the paper as said arm rises and falls with the multiplying-lever. The spring is on or forms part of a second head $g^4$, which is also pinned to the multiplying-lever on the pivot or axis $g^2$, and is prolonged into a spring-arm G', which extends down upon the rear face of the front of frame B and presses against that face, being provided at its contacting point with a roller $g^5$ to reduce friction. This arm serves in a measure to guide and steady the marking-arm in its movement, the two arms G G' forming, in effect, spring-jaws, which press against the front of the frame B from opposite sides. This indicating mechanism is one in which the parts are reduced to a minimum number and in which this gain in simplicity is attained without impairing the efficiency of the mechanism. Indeed, its efficiency is rather enhanced than otherwise, owing, among other things, to the few connections and consequent reduction of lost motion. I may remark here that while I have represented this indicating mechanism as connected to and used in conjunction with a convexly-corrugated diaphragm, yet the same may be used with diaphragms of other constructions, whether corrugated or plain.

The electrical alarm, which sounds whenever certain limits of pressure are exceeded in either direction, consists of an alarm-bell I, an automatic rheotome L for sounding the bell, a normally-open electric circuit for the same, and two circuit-closers N N', one for "high" and the other for "low" pressure, by the operation of either one of which the circuit can be closed. I am of course aware that an electrical alarm included in a normally-open circuit which is closed by suitable mechanism whenever temperature or pressure, or the like, exceeds a certain limit in either direction is not new, broadly considered. My improvements in this direction are designed to meet the practical needs and requirements of the recording-instruments to which my invention relates, and particularly to render the alarm susceptible of ready adjustment to any given limits of pressure, while permitting it at all times to be easily and quickly tested to ascertain whether it is in proper condition without in any way disturbing or affecting the particular adjustment to which it has been set.

Upon a suitable post on the frame of the instrument is fastened a bell I, the clapper I' of which is fast to the armature-lever $i'$ of the magnet $i$, the parts $i\,i'$, with their circuit-connections, constituting the ordinary automatic rheotome of an alarm or call bell. The high circuit-closer consists of an insulated arm or rod N, which has a reciprocating motion imparted to it by being jointed to a projection $n^2$, extending downwardly from one side of the skeleton frame of the multiplying-lever. The compound rod thence extends forward and out through a bearing (lined with insulating material) in the front of the frame B. The low circuit-closer consists of a similar arm N', similarly arranged and mounted on the opposite side of the skeleton frame of the multiplying-lever, save that it is pinned or jointed to a projection $n^3$, which extends upwardly from said frame. Thus when the multiplying-lever vibrates the two rods will reciprocate in opposite directions, rod N advancing and rod N' receding when the lever rises, and moving in the contrary direction, respectively, when the lever descends. In the path of each circuit-closer, and in position to make contact with it when it has advanced to the requisite extent, is a stationary contact $n$ or $n'$, each contact consisting of an adjusting-screw, which screws through an opening formed for it in the lower end of a spring-arm $o$, which hangs down in front of the front plate of the instrument. The upper end of the spring-arm is curved or arched, and at its extremity is fastened by an insulated support to the frame B. By screwing the contacts $n\,n'$ in or out they can be adjusted so as to be met by their respective rods whenever the lever rises or falls beyond a predetermined limit. At the same time the spring-arms $o$ afford ready means by which each contact can be operated like a spring push-button to close the circuit whenever it is desired to test the condition of the circuit or the parts included therein, the contact, as soon as pressure is removed from it, springing back at once into its normal adjusted position.

In the main figure in the drawings both high and low alarms are to be sounded on one bell located on the instrument itself, and under this arrangement the wiring is as follows, (see Fig. 5:) From one pole of battery by wire 1 to frame of instrument, from frame of instrument to armature-lever $i'$ by wire 2, from back-stop $i^2$ of rheotome by wire 3, to both contacts $n$ $n'$, from either circuit-closer N or N', by wire 4, electrically connected to both of said circuit-closers to and through magnet $i$, and thence back to other pole of battery. It may be desired at times to have two alarms—one on the instrument itself and another located at a distant point—and such an arrangement is represented diagrammatically in Fig. 6.

The wiring and circuit arrangement in the instrument is represented by the dotted lines and requires no explanation. In Fig. 7 I have shown diagrammatically still another arrangement—one in which the bell is removed from the instrument, and in lieu thereof there are provided two bells, one for high and the other for low pressure, placed outside of the gage or at a distant point. The wiring and circuit connections in this arrangement also are simple, and require no explanation other than that afforded by the figure itself.

Having described my improvements and the best way now known to me of carrying the same into effect, I desire to state, in conclusion, that I do not restrict myself to the particular details hereinbefore shown and set forth in illustration of these improvements, for manifestly the same can be varied considerably without departure from my invention; but

What I claim as new, and desire to secure by Letters Patent, is—

1. The combination of the diaphragm-spring, the multiplying-lever, the connection between the lever and the diaphragm-spring, and the flexible marking-arm attached to and carried solely by the lever and bearing toward and against the surface to be marked with yielding pressure, substantially as and for the purposes hereinbefore set forth.

2. The combination of the multiplying-lever, the flexible marking-arm attached to and carried by said lever, the diaphragm-spring, the connecting-rod between the diaphragm-spring and the multiplying-lever, and the filling or backing for resisting deflection of the diaphragm-spring beyond a predetermined limit, substantially as and for the purposes hereinbefore set forth.

3. The combination of the diaphragm-spring-containing chamber, the convexly-corrugated diaphragm-spring located therein in such manner that the pressure will be exerted against its convexed surface, the multiplying-lever, the connection between the lever and the diaphragm-spring, and the flexible marking-arm attached to and carried solely by the lever and bearing toward and against the surface to be marked with yielding pressure, substantially as and for the purposes hereinbefore set forth.

4. The combination, with the corrugated diaphragm spring or springs and the supporting-vase, of the metal filling or backing molded or shaped to the exact counterpart of the shape assumed by the upper surface of the diaphragm when the latter is distended or deflected to the predetermined limit, and so located that the diaphragm when thus distended or deflected will meet it throughout its entire surface, and thereby will be supported throughout its whole area against excessive pressure, as and for the purposes hereinbefore set forth.

5. The combination, in a pressure-gage, with the diaphragm spring or springs and the fluid chamber or receptacle, of an untempered steel or iron diaphragm bunched with said diaphragm-springs, substantially as and for the purposes hereinbefore set forth.

6. The combination of the fluid chamber or receptacle, the diaphragm spring or springs, the untempered steel or iron diaphragm bunched with said diaphragm-springs, and the thin flexible sheathing for preventing corroding action upon the same, substantially as and for the purposes hereinbefore set forth.

7. The combination, with the indicating and recording mechanism and the alarm-bell and electrical appliances for operating the same, of a circuit-closer included in the circuit of said electrical appliances, and consisting of a rod connected to and actuated from the indicating mechanism, a stationary contact to and from which said rod moves, and a spring-support in which said contact is adjustably mounted, substantially as and for the purposes hereinbefore set forth.

8. The combination, with the indicating and recording mechanism, and the alarm-bell and electrical appliances for operating the same, of high and low circuit-closers included in the circuit of said electrical appliances, and consisting of rods actuated from the indicating mechanism to move to and from stationary contacts, said contacts having contact pins or points carried by and adjustable in spring-supports, substantially as and for the purposes hereinbefore set forth.

9. The combination of the diaphragm spring or springs, the multiplying-lever, the connecting-rod between the lever and diaphragm-spring, the flexible marking-arm attached to and carried by the multiplying-lever, the reciprocating circuit-closing rod N or N', jointed to and moved by the multiplying-lever, and the adjustable contact point or pin $n$ or $n'$ and the flexible or spring support for the same, substantially as and for the purposes hereinbefore set forth.

10. The multiplying-lever secured at its rear to the cross-bars of a rectangular skeleton frame, the sides of which are journaled in or pivoted to the frame of the instrument, in combination with the diaphragm spring or springs and the connection between the same and the lever, substantially as and for the purposes hereinbefore set forth.

11. The combination, with the pivoted multiplying-lever, of the flexible marking-arm, its fellow arm pivoted or pinned to the lever and extending down upon opposite sides or faces of the front plate of the instrument, and a spring whereby said arms are caused to bear from opposite sides upon said plate with a constant pressure throughout and during the movements of the multiplying-lever, substantially as and for the purposes hereinbefore set forth.

In testimony whereof I have hereunto set my hand this 7th day of June, 1890.

JARVIS B. EDSON.

Witnesses;
 WILLIAM RANNEY,
 EWELL A. DICK.